United States Patent [19]

Lettau et al.

[11] Patent Number: 5,035,853
[45] Date of Patent: Jul. 30, 1991

[54] NUCLEAR REACTOR FUEL ASSEMBLY

[75] Inventors: Hans Lettau, Effeltrich; Roland Rink, Bad Koenigshofen, both of Fed. Rep. of Germany

[73] Assignee: Siemens Aktiengesellschaft, Munich, Fed. Rep. of Germany

[21] Appl. No.: 313,619

[22] Filed: Feb. 21, 1989

[30] Foreign Application Priority Data

Feb. 22, 1988 [DE] Fed. Rep. of Germany ....... 3805507

[51] Int. Cl.$^5$ .............................................. G21C 3/34
[52] U.S. Cl. .................................... 376/441; 376/442
[58] Field of Search ...................... 376/441, 224, 442

[56] References Cited

U.S. PATENT DOCUMENTS

| 4,556,531 | 12/1985 | Curulla | 376/441 |
| 4,578,240 | 3/1986 | Cadwell | 376/441 |

FOREIGN PATENT DOCUMENTS

| 0033263 | 8/1981 | European Pat. Off. |
| 0210526 | 2/1987 | European Pat. Off. |
| 2137158 | 4/1972 | Fed. Rep. of Germany |
| 2099595 | 3/1972 | France |
| 499850 | 1/1971 | Switzerland |

*Primary Examiner*—Brooks H. Hunt
*Assistant Examiner*—Meena Chelliah
*Attorney, Agent, or Firm*—Herbert L. Lerner; Laurence A. Greenberg

[57] ABSTRACT

A nuclear reactor fuel assembly includes at least one uprightly disposed spacer having a grid of intersecting sheet-metal struts defining meshes therebetween. Mutually parallel rods are each disposed in a respective one of the meshes. Strip-like contact springs are parallel to the rods and each have a side facing toward and a side facing away from a respective one of the struts. Each of the contact springs are disposed in a respective one of the meshes and have two strip ends both being retained on the one strut. Each of the contact springs have a contact location being resilient relative to the one strut for contacting a rod. The contact location is spaced apart from both of the strip ends. Each of the contact springs has an undulatory transverse curve disposed at the contact location on the side of the contact spring facing toward the one strut. The contact springs are continuously smooth and flat from the contact location to the strip ends resting on the one strut.

5 Claims, 3 Drawing Sheets

NUCLEAR REACTOR FUEL ASSEMBLY

The invention relates to a nuclear reactor fuel assembly including at least one uprightly disposed spacer having a grid of intersecting sheet-metal struts defining meshes therebetween, mutually parallel rods each being disposed in a respective one of the meshes, and strip-like contact springs parallel to the rods, each of the contact springs being disposed in a respective one of the meshes and having two strip ends both being retained on one of the struts, each of the contact springs having a contact location being resilient relative to the strut for contacting a rod, the contact location being spaced apart from both of the strip ends, each of the contact springs having an undulatory transverse curve at the contact location, and the contact springs being continuously smooth and flat from the contact location to the strip ends resting on the strut.

A fuel assembly of the type mentioned above is known from Swiss Patent No. 499 850. The contact spring of the known nuclear reactor fuel assembly is located on one side of one strut of the spacer and is secured at both strip ends to the strip ends of an identically constructed contact spring located on the other side of the strut. The undulating transverse curve at the contact locations of the strip-like contact springs for the associated rod is located on the side of the associated strip-like contact spring facing away from the strut.

In a nuclear reactor, the fuel assembly is longitudinally exposed to the flow of a coolant, which therefore also flows through the individual meshes in the spacer. This leads to a relatively high resistance to the flow of coolant through the individual meshes of the spacer and therefore through the overall fuel assembly.

It is accordingly an object of the invention to provide a nuclear reactor fuel assembly, which overcomes the hereinafore-mentioned disadvantages of the heretofore-known devices of this general type and which keeps the flow resistance for the coolant passing through the individual meshes of the spacer and therefore through the overall fuel assembly optimally low.

With the foregoing and other objects in view there is provided, in accordance with the invention, a nuclear reactor fuel assembly, comprising at least one uprightly disposed spacer having a grid of intersecting sheet-metal struts defining meshes therebetween, mutually parallel rods, especially fuel rods containing nuclear fuel, each being disposed in a respective one of the meshes, and strip-like contact springs being parallel to the rods and each having a side facing toward and a side facing away from a respective one of the struts, each of the contact springs being disposed in a respective one of the meshes and having two strip ends both being retained on the one strut, each of the contact springs having a contact location being resilient relative to the one strut for contacting a rod, the contact location being spaced apart from both of the strip ends, each of the contact springs having an undulatory transverse curve disposed at the contact location on the side of the contact spring facing toward the one strut, and the contact springs being continuously smooth and flat from the contact location to the strip ends resting on the one strut.

As a result, a gap is formed between the rod and the contact spring resting thereon for the coolant flowing through each individual mesh in the longitudinal direction of the fuel assembly in a nuclear reactor, which narrows and widens uniformly. The overall result is an optimally low flow resistance for the coolant of the nuclear reactor fuel assembly.

In accordance with a concomitant feature of the invention, the undulatory transverse curve is in the form of a single curve disposed at the contact location, and the contact spring has transition locations adjacent the undulatory transverse curve being unequally spaced apart from the one strut on which the contact spring is retained.

Other features which are considered as characteristic for the invention are set forth in the appended claims.

Although the invention is illustrated and described herein as constructed in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
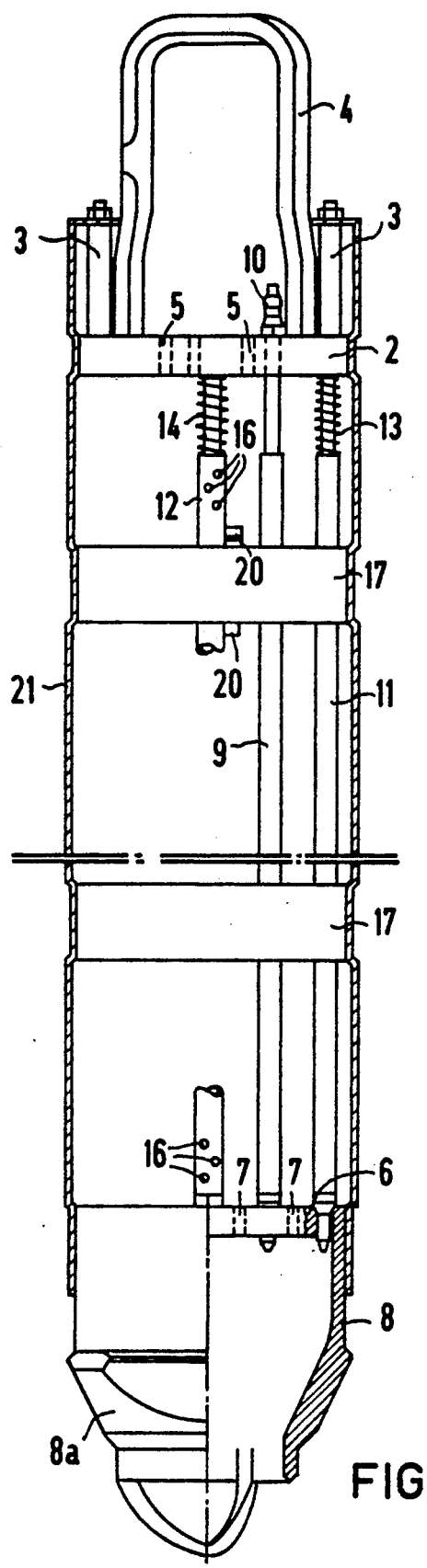
FIG. 1 is a diagrammatic, partly longitudinal-sectional, side-elevational view of a nuclear reactor fuel assembly according to the invention for a boiling water reactor.
Figure 3:
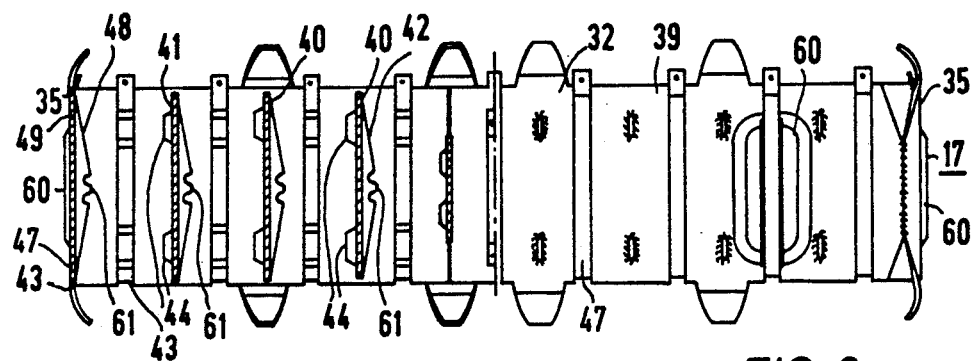
FIG. 3 is a cross-sectional view of the spacers taken along the dot-dash line III—III of FIG. 2, in the direction of the arrows.

Referring now to the figures of the drawing in detail and first, particularly, to FIG. 1 thereof, there is seen a nuclear reactor fuel assembly having a fuel assembly top with a square grid plate 2, on the top of which two stay bolts 3 and a handle 4 are provided. The grid plate 2 is provided with a plurality of flow ducts 5, which are diagrammatically represented by broken lines. The flow ducts 5 run in the longitudinal direction of the fuel assembly and the coolant in the reactor core of a boiling water reactor flows through the ducts. The grid plate 2 is disposed at right angles to the longitudinal direction of the fuel assembly.

The fuel assembly of FIG. 1 is also provided with a fuel assembly bottom, which likewise has a square grid plate 6 disposed at right angles to the longitudinal direction of the fuel assembly. The square grid plate 6 likewise has a plurality of flow ducts 7 which are diagrammatically indicated by broken lines i the longitudinal direction of the fuel assembly, for the coolant in the core of a boiling water reactor. At the bottom of the grid plate 6 of the fuel assembly bottom is a fitting device 8 that is open toward the grid plate 6 and inserted vertically from above into one mesh of a so-called core lattice located in the core of the boiling water reactor.

The fuel assembly of FIG. 1 also has a number of fuel rods 9, which are filled with nuclear fuel, are screwed into the grid plate 6 of the fuel assembly bottom and extend through the grid plate 2 of the fuel assembly top, where they are screwed to the grid plate 2 with a nut 10 located on the top of the grid plate 2. These fuel rods 9 serve as so-called retaining rods for the top and bottom of the fuel assembly.

Other fuel rods 11 filled with nuclear fuel and a central water rod 12 have ends which are loosely inserted into openings in the grid plates 2 and 6 of the top and bottom of the fuel assembly.

Holding down springs 13 and 14, which are compression springs that are constructed as helical springs, are seated on the upper ends of the fuel rods 11 and the water rod 12. One end of each holding down spring is supported on the fuel rod 11 or the water rod 12 and the other end is supported on the lower surface of the grid plate 2 of the fuel assembly top.

The central water rod 12 is a tube made of a zirconium alloy that is plugged at both ends. Radial flow openings 16 for liquid water are provided in the ends of the jacket of the water rod 12.

Figure 2:
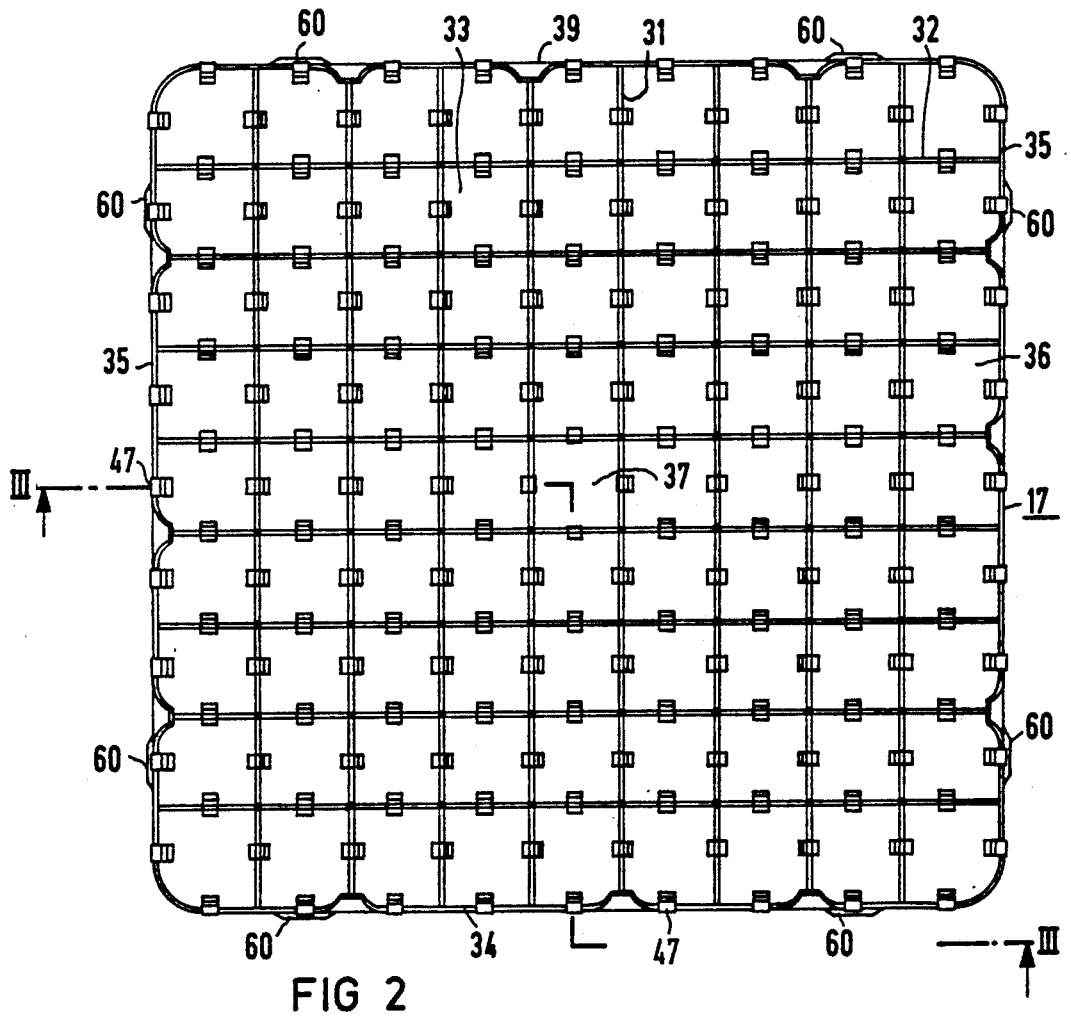
FIG. 2 is a plan view of a spacer of the fuel assembly of FIG. 1.
Figure 4:
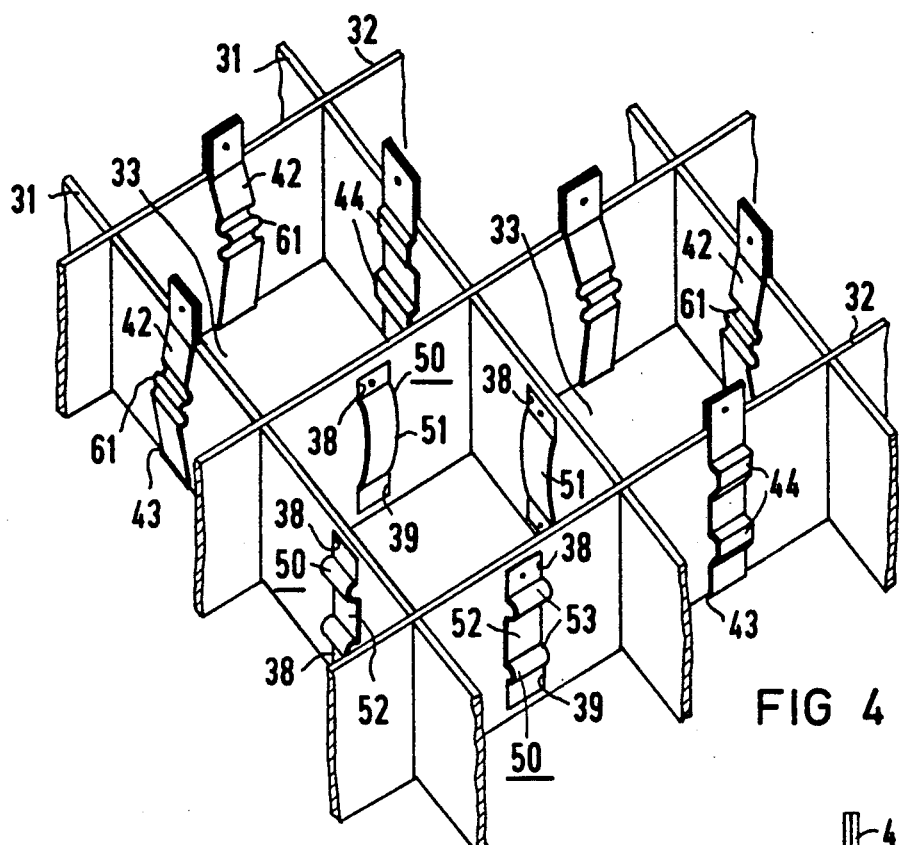
FIG. 4 is an enlarged, fragmentary perspective view of a portion of the spacer of FIGS. 2 and 3.

The fuel assembly of FIG. 1 also has a plurality of spacers 17 between the top and bottom of the fuel assembly, which are spaced apart from one another in and from the top and bottom of the fuel assembly in the longitudinal direction of the fuel assembly. As seen in FIG. 2, these spacers 17 are square, are in alignment with the grid plate 2 of the fuel assembly top and the grid plate 6 of the fuel assembly bottom, and are formed of a grid made up of sheet-metal struts that intersect one another at right angles, stand on end and are made of a zirconium alloy. One of the fuel rods 9 or 11 or the water rod 12 is disposed in each respective space, mesh or opening 33, 36 of the spacers 17. Each of the spacers 17 is positioned between two fins 20 that are located on the outside of the jacket surface of the water rod 12, are suitably spaced apart from one another in the longitudinal direction of the water rod 12 and therefore in the longitudinal direction of the fuel assembly as well, and are in alignment with one another.

Also associated with the fuel assembly of FIG. 1 is a duct tube or cladding case 21 with a square cross section, which is the so-called fuel channel or fuel assembly case, that is also made of a zirconium alloy and is mounted on the outside of the fuel assembly top, the spacers 17 and the fuel assembly bottom and envelops the fuel rods 9 and 11 and the water rod 12, forming a flow channel for the coolant in the core of a boiling water reactor.

As FIGS. 2-5 show, the square spacer 17 has a first group of mutually parallel inside struts 31 and a second group of mutually parallel inside struts 32 of sheet metal. The inside struts 31 and 32 of the two groups intersect one another at right angles forming 81 square spaces, meshes or openings 33, nine to a side. Both the inside struts 31 as well as the inside struts 32 which are at right angles to the inside struts 31, are disposed on end; that is, the lateral surfaces thereof are parallel to the longitudinal direction of the fuel assembly of FIG. 1. The inside struts 31 and 32 are surrounded by sheet-metal outer struts 34 and 35 which are disposed on end. The outer struts 35 are parallel to the inner struts 31 and the outer struts 34 are parallel to the inner struts 32. The outside of the outer struts 34 and 35 are each provided with two contact knobs 60 which point outward, for the fuel channel or cladding case 21.

Each of the inner spaces, meshes or openings 33 has four contact elements 40 associated therewith. A contact element is formed of a sheet-metal strip made of a nickel-based alloy, which is bent to form a hairpin-like clamp with two legs 41 and 42. The contact element fits with the legs 41 and 42 over both sides of a single inner strut 31 or 32 of the spacer 17, in the middle of one side of the space, mesh or opening 33. The two ends of the sheet-metal strip and thus the ends of the legs 41 and 42 are rigidly joined together by spot welding. The lower edge of each respective inner strut 31 or 32 in the middle of each side of the inner spaces, meshes or openings 33 is provided with a detent notch 43 for receiving the flexing point of the sheet-metal strip forming the contact element 40. One leg 41 of the contact element 40 rests flush on the respective inner strut 31 or 32, while the other leg 42 on the other side of the inner strut is curved outward, forming a strip-like contact spring that is parallel to a fuel rod 9 or 11 located in the associated inner space, mesh or opening 33. Accordingly, both strip ends of the contact spring formed by the leg 42 rest on the inner strut 31 or 32, where it is also retained. The middle of the leg 42 forming the contact spring has two undulatory or wavy transverse curves 61 in the associated inner space, mesh or opening 33, at a contact location for the fuel rod 9 or 11 that is resilient beyond or relative to the inner strut 31 or 32. The two transverse curves 61 are disposed on the side of the contact spring oriented toward the inner strut 31 or 32 on which the contact spring is retained. Otherwise, the contact spring formed by the leg 42 is continuously smooth and flat at the respective strip ends thereof resting on the inner strut 31 or 32, beginning at the contact location for the fuel rod 9 or 11 that is provided with the undulatory transverse curves 61 and is resilient beyond or relative to the associated inner strut 31 or 32. The outside of the leg 41 of the contact element 40 which rests flush on the other flat side of the inner strut 31 or 32, is provided with two stationary transverse curves 44 which form rigid contact knobs for the fuel rod 9 or 11 located in the associated inner space, mesh or opening 33. The contact element on the opposite side of the inner space, mesh or opening 33 has a leg 42 which is constructed as an outwardly curved contact spring, so that a three-point support for the fuel rod 9 or 11 disposed in the associated inner space, mesh or opening 33 is assured in each inner space, mesh or opening 33 between two inner struts 31 and 32 that are parallel to one another.

In the middle of the sides of the outer spaces, meshes or openings 36, each of the outer struts 34 and 35 of the spacer 17 also have contact elements 47 positioned in detent notches 43 on the lower edges thereof. Like the contact elements 40, the contact elements 47 are bent into a clamp from a sheet-metal strip. As with the contact elements 40, the ends of the sheet-metal strips are also rigidly joined together by spot welding. However, only the leg 48 of the contact elements 47 located in the outer spaces, meshes or openings 36 is bent outward to form a contact spring with a contact location that is resilient beyond or relative to the outer strut 34 or 35 for a fuel rod 9 or 11. The leg 49 of the contact element 47 located on the outside of the outer struts 34 or 35 is continuously flat and rests flatly and largely flush on the outside of the outer strut 34 or 35. As with the contact element 40, the contact spring formed by the leg 48 has two undulatory transverse curves 61 at the contact surface and is resilient beyond or relative to the outer strut 34 or 35, for a fuel rod 9 or 11. The undulatory transverse curves 61 are located on the side of the contact spring that surfaces the outer strut 34 or 35 on which the contact spring is retained As with the contact element 40, the strip ends of the contact spring rest on the outer strut 34 or 35 and it is continuously smooth and flat from its contact location, which is resilient beyond or relative to the outer strut 34 or 35 for the rod 9 or 11, to the strip ends thereof resting on the outer strut 34 or 35.

A central inner space or mesh 37 is provided in the spacer 17 for the water rod 12. Two openings 38 and 39 for a contact element 50 are provided the inner struts 31 and 32 in the middle of each side of the inner mesh 37. The openings 38 and 39 are mutually spaced apart and alongside one another in the longitudinal direction of the water rod 12 and therefore in the longitudinal direction of the fuel assembly. The contact element 50 is again made of a strip of sheet metal formed of a nickel-based alloy, which is threaded through one of the openings 38 and 39 and bent into a clamp with two legs 51 and 52. The ends of the legs 51 and 52 are rigidly joined together by spot welding in the other of the openings 38 and 39. All of the legs 51 of the contact elements 50 located in the central inner mesh 37, are curved outward, forming a contact spring for the water rod 12, while the other legs 52 rest flush on the associated inner struts 31 or 32 and have two transverse curves 53 serving as rigid contact knobs for fuel rods 9 or 11 in adjoining inner spaces, meshes or openings 33.

The fuel assembly of FIG. 1 is disposed vertically in the reactor core of a boiling water reactor, with the fuel assembly top facing upward. Liquid water flows from the bottom in the reactor core through the fuel assembly bottom and into the fuel assembly which is provided with the duct tube or cladding case 21, and the water evaporates there, so that water vapor flows upward and out through the fuel assembly top. In order to improve the moderation, liquid water that enters the water rod 12 through the openings 16 located at the lower end, flows through the water rod 12 without evaporating and exits through the openings 16 at the upper end of the water rod while still in liquid form, and only then evaporates in the steam flowing past it.

Figure 5:
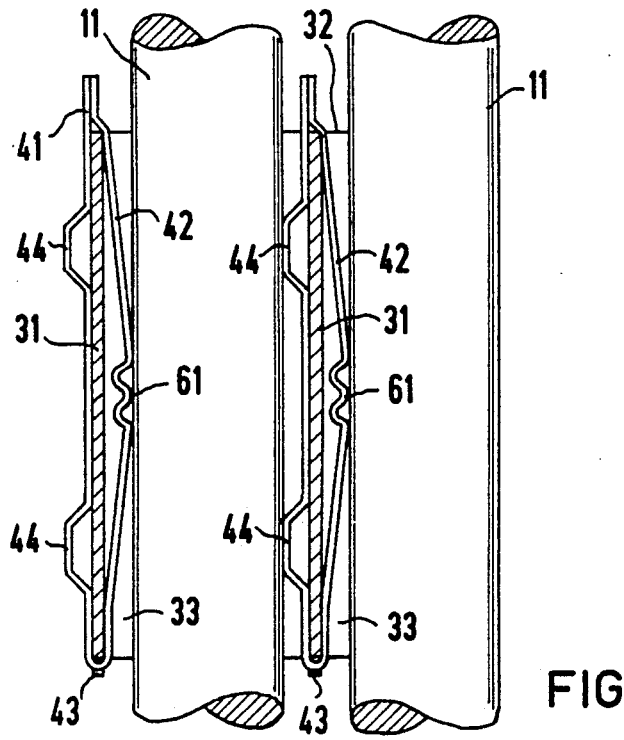
FIG. 5 is a fragmentary, longitudinal-sectional view through a mesh in the spacer of FIGS. 2-4.

As FIG. 5 shows in particular, the gap for coolant flowing from bottom to top through a space, mesh or opening 33 between the leg 42 forming the contact spring and the fuel rod 11 located in the space, mesh or opening 33, initially narrows uniformly and then widens again uniformly, so that the flow resistance in the space, mesh or opening 33 is optimally low.

Figure 6:
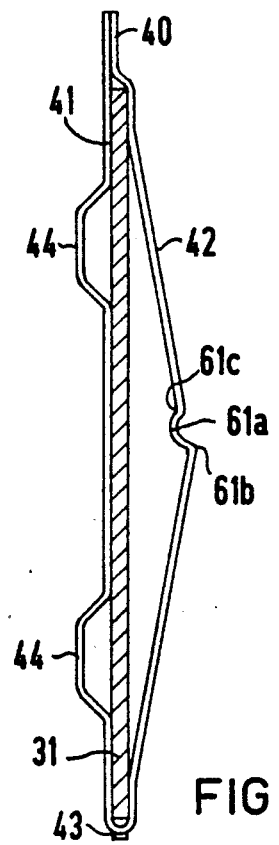
FIG. 6 is a longitudinal-sectional view of another embodiment of the contact spring for the nuclear reactor fuel assembly of FIG. 1.

The contact element of FIG. 6, in which identical elements are provided with the same reference numerals as in FIGS. 2-5, only differs from the contact element 40 of FIGS. 2-5 due to the fact that only a single undulatory transverse curve 61a is provided at the contact location of the contact spring for a rod, which is formed by the leg 42. The contact spring becomes particularly streamlined if the leg 42 forming the contact spring has transition points 61b and 61c leading to the undulatory transverse curve 61a, which are unequally spaced apart from the strut 41 on which the contact element 40 is attached, and through which the contact spring formed by the leg 42 is retained. It is particularly advantageous if the transition point 61b located closer to the bottom of the fuel assembly is spaced apart from the strut 31 by a greater distance than the other transition point 61c located closer to the fuel assembly top.

We claim:

1. Nuclear reactor fuel assembly, comprising at least one uprightly disposed spacer having a grid of intersecting sheet-metal struts defining meshes therebetween, mutually parallel rods each being disposed in a respective one of said meshes, and strip-like contact springs being parallel to the rods and each having a side facing toward and a side facing away from a respective one of said struts, each of said contact springs being disposed in a respective one of said meshes and having two strip ends both being retained on said one strut, each of said contact springs having a contact location being resilient relative to said one strut for contacting a rod, said contact location being spaced apart from both of said strip ends, each of said contact springs having an undulatory transverse curve disposed at said contact location on said side of said contact spring facing toward said one strut, and said contact springs being continuously smooth and flat from said contact location to said strip ends resting on said one strut, wherein said undulatory transverse curve is in the form of a single curve disposed at said contact location, and said contact spring has transition locations adjacent said undulatory transverse curve being unequally spaced apart from said one strut on which said contact spring is retained.

2. Nuclear reactor fuel assembly, comprising at least one uprightly disposed spacer having a grid of intersecting sheet-metal struts defining meshes therebetween for receiving mutually parallel rods in a respective one of said meshes, and strip-like contact springs being parallel to the rods and each having a side facing toward and a side facing away from a respective one of said struts, each of said contact springs being disposed in a respective one of said meshes and having
 a) two strip ends both resting on said one strut and being retained thereon,
 b) two border regions, at least one of which to be contacted by a rod,
 c) two smooth intermediate strip parts each extending from one of said strip ends to a respective one of said border regions,
 d) a contact location having an two undulatory transverse curves, said contact location being resilient relative to said one strut and including said two border regions, said border regions being curved towards said one strut, and
 e) said smooth intermediate strip parts being continuously flat before a rod is disposed in the respective mesh.

3. Nuclear reactor fuel assembly according to claim 2, wherein said smooth intermediate strip parts are slightly bent when said contact location contacts a rod.

4. Nuclear reactor fuel assembly according to claim 2, wherein at least some of said rods are fuel rods containing nuclear fuel.

5. Nuclear reactor fuel assembly, comprising at least one uprightly disposed spacer having a grid of intersecting sheet-metal struts defining meshes therebetween for receiving mutually parallel rods in a respective one of said meshes, and strip-like contact springs being parallel to the rods and each having a side facing toward and a side facing away from a respective one of said struts, each of said contact springs being disposed in a respective one of said meshes and having
 a) two strip ends both resting on said one strut and being retained thereon,
 b) a first and a second border region disposed at given respective first and second distances from said strut, said first and second distances being different from each other, c) a continuously smooth first intermediate strip part extending from one of said strip ends to said first border region, d) a contact location for contacting a respective one of the rods having an undulatory transverse curve in the form of a single curve, said contact location being resilient relative to said one strut and including said first border region, said second border region being curved towards said one strut, and e) a continuously smooth second intermediate strip part extending from said second border region to the other of said strip ends.

* * * * *